US011590521B2

(12) United States Patent
Abbott et al.

(10) Patent No.: US 11,590,521 B2
(45) Date of Patent: Feb. 28, 2023

(54) POWDER DISPENSING APPARATUS WITH VORTEX AGITATION

(71) Applicants: Timothy David Abbott, Orchard Park, NY (US); Martin Ballowe, Hamburg, NY (US)

(72) Inventors: Timothy David Abbott, Orchard Park, NY (US); Martin Ballowe, Hamburg, NY (US)

( * ) Notice: Subject to any disclaimer, the term of this patent is extended or adjusted under 35 U.S.C. 154(b) by 0 days.

(21) Appl. No.: 17/676,930

(22) Filed: Feb. 22, 2022

(65) Prior Publication Data

US 2022/0266278 A1 Aug. 25, 2022

Related U.S. Application Data

(60) Provisional application No. 63/200,245, filed on Feb. 24, 2021.

(51) Int. Cl.
*B05B 7/24* (2006.01)
*B65D 83/06* (2006.01)

(52) U.S. Cl.
CPC ............ *B05B 7/2491* (2013.01); *B65D 83/06* (2013.01)

(58) Field of Classification Search
CPC ..... B05B 7/2491; B05B 7/1486; B65D 83/06; A01M 9/0084; A01M 9/0007
See application file for complete search history.

(56) References Cited

U.S. PATENT DOCUMENTS

| | | | | | |
|---|---|---|---|---|---|
| 2,286,841 | A * | 6/1942 | Smith | F16K 15/044 | 137/539 |
| 2,851,581 | A * | 9/1958 | Libby | B23K 9/325 | 219/74 |
| 3,501,062 | A * | 3/1970 | Catalano | B65G 53/66 | 406/134 |
| 10,562,051 | B2 * | 2/2020 | Cotier | B65D 88/66 | |
| 2009/0057346 | A1 * | 3/2009 | Jang | G01F 11/46 | 222/362 |
| 2010/0264170 | A1 * | 10/2010 | Chiu | G01F 11/24 | 222/239 |
| 2013/0061851 | A1 * | 3/2013 | Jones | A61M 15/0028 | 128/203.15 |
| 2022/0266278 | A1 * | 8/2022 | Abbott | A01M 9/0084 | |

* cited by examiner

*Primary Examiner* — Bob Zadeh
(74) *Attorney, Agent, or Firm* — Stadler IP Law PLLC

(57) ABSTRACT

A powder dispensing device including an inlet, a flow portion for providing a tortuous path and powder anti-back flow, wherein the powder dispensing device does not require restrictive filters, a powder container having concentric ribs and vortex generating vanes to provide vortex generation or agitation for the powder, a cap, and an outlet.

20 Claims, 3 Drawing Sheets

POWDER DISPENSING APPARATUS WITH VORTEX AGITATION

CROSS-REFERENCE TO RELATED APPLICATIONS

This application claims priority to U.S. Provisional Application Ser. No. 63/200,245, filed on Feb. 24, 2021, the entire disclosure of which is hereby incorporated herein by reference.

FIELD OF INVENTION

The present invention relates to powder dispensing devices and, more particularly, a powder dispensing apparatus with vortex agitation.

BACKGROUND OF INVENTION

Current pesticide powder applicators do not efficiently discharge powder from the powder container due to poor agitation and circulation of the powder. Additionally, current devices are easily clogged due to the restrictive filters used to prevent powder from falling ("backwards") from the container towards the pressure source.

Specifically, current devices direct the motive force (pneumatic pressure) through a small annular opening that then directly interacts with the powder in the container. This current process, however, does not properly agitate the powder and only enables a small amount of powder to be carried out of the container via the discharge tube, thereby resulting in inefficient powder application.

Current devices also utilize restrictive filters to prevent the powder in the container from backflowing from the container towards the pressure source under the effects of gravity. These filters, however, also restrict the airflow into the container, thereby making the powder application even more inefficient. These filters also often clog, rendering the devices unusable.

In short, current devices do not dispense powder efficiently, resulting in a longer application process. These devices also use restrictive filters which tend to clog, resulting in inoperable devices.

As can be seen, there is a need for a powder dispensing apparatus with vortex agitation for increased powder dispensing. The present invention increases powder application efficiency by, first, providing thorough agitation throughout the contained powder via vortex swirling action, and second, by eliminating the restrictive filter and its associated clogging issues.

The present invention embodies a device, system, and method for providing a novel means of agitating the powder inside the container through a static vane geometry configured to generate a vortex throughout the base of the container. The device also eliminates the need for restrictive filters and their attendant disadvantages mentioned above. Specifically, the device prevents powder from flowing towards the pressure source by a concentric rib geometry incorporated into the vortex generating vanes as well as through the use of a novel complex geometry below the vortex vanes, defining a torturous path preventing powder from flowing towards the pressure source under the effects of gravity.

The vortex generating vanes provide more throughput—through greater agitation of the powder in the container—resulting in more efficient discharge of powder from the container. No prior art achieves this. The ability of the device to prevent the backflow of powder from the container towards the pressure source without the need for an easily clogged filter is also unique when compared to the prior art.

SUMMARY OF THE INVENTION

Accordingly, it is the subject of this invention to provide a powder dispensing device that is capable of preventing back flow of powder without the use of a filter and to provide greater agitation of powder.

In one embodiment, a powder dispensing device is provided, including: an inlet having an inner diameter and outer diameter and a top and a bottom; a flow portion having a convex curved bottom and a cylindrical top and wherein the convex curved bottom is in communication with the top of the inlet; a conical portion having a top and a bottom located inside the flow portion such that a flow path is created between the conical portion and the flow portion thereby allowing for fluid flow from the inlet and wherein the conical portion has at least two cutouts located along a top circumference of the conical portion; a funnel portion having a top and a bottom located inside the top of the conical portion and wherein there are at least two pairs of interlocking c-shaped supports between the funnel portion and the conical portion such that a tortuous flow path is created between the funnel portion and the conical portion; a powder container having a conical top and a cylindrical bottom and wherein the cylindrical bottom is in communication with the cylindrical top of the flow portion; at least two concentric ribs located in the cylindrical bottom of the powder container; at least two vortex generating vanes located above the at least two concentric ribs; a powder container cap having a conical top and a cylindrical bottom and wherein the conical top has a cutout for receiving an outlet tube and wherein the cylindrical bottom is in communication with the cylindrical top of the powder container; and an outlet tube that is in communication with the powder container and is inserted through the cutout of the top of the powder container cap.

In one embodiment, a powder dispensing device is provided, consisting essentially of: an inlet having an inner diameter and outer diameter and a top and a bottom; a flow portion having a convex curved bottom and a cylindrical top and wherein the convex curved bottom is in communication with the top of the inlet; a conical portion having a top and a bottom located inside the flow portion such that a flow path is created between the conical portion and the flow portion thereby allowing for fluid flow from the inlet and wherein the conical portion has at least two cutouts located along a top circumference of the conical portion; a funnel portion having a top and a bottom located inside the top of the conical portion and wherein there are at least two pairs of interlocking c-shaped supports between the funnel portion and the conical portion such that a tortuous flow path is created between the funnel portion and the conical portion; a powder container having a conical top and a cylindrical bottom and wherein the cylindrical bottom is in communication with the cylindrical top of the flow portion; at least two concentric ribs located in the cylindrical bottom of the powder container; at least two vortex generating vanes located above the at least two concentric ribs; a powder container cap having a conical top and a cylindrical bottom and wherein the conical top has a cutout for receiving an outlet tube and wherein the cylindrical bottom is in communication with the cylindrical top of the powder container; and an outlet tube that is in communication with the powder container and is inserted through the cutout of the top of the powder container cap.

In one embodiment, a powder dispensing device is provided, consisting of: an inlet having an inner diameter and outer diameter and a top and a bottom; a flow portion having a convex curved bottom and a cylindrical top and wherein the convex curved bottom is in communication with the top of the inlet; a conical portion having a top and a bottom located inside the flow portion such that a flow path is created between the conical portion and the flow portion thereby allowing for fluid flow from the inlet and wherein the conical portion has at least two cutouts located along a top circumference of the conical portion; a funnel portion having a top and a bottom located inside the top of the conical portion and wherein there are at least two pairs of interlocking c-shaped supports between the funnel portion and the conical portion such that a tortuous flow path is created between the funnel portion and the conical portion; a powder container having a conical top and a cylindrical bottom and wherein the cylindrical bottom is in communication with the cylindrical top of the flow portion; at least two concentric ribs located in the cylindrical bottom of the powder container; at least two vortex generating vanes located above the at least two concentric ribs; a powder container cap having a conical top and a cylindrical bottom and wherein the conical top has a cutout for receiving an outlet tube and wherein the cylindrical bottom is in communication with the cylindrical top of the powder container; and an outlet tube that is in communication with the powder container and is inserted through the cutout of the top of the powder container cap.

DETAILED DESCRIPTION OF THE INVENTION

Figure 1:
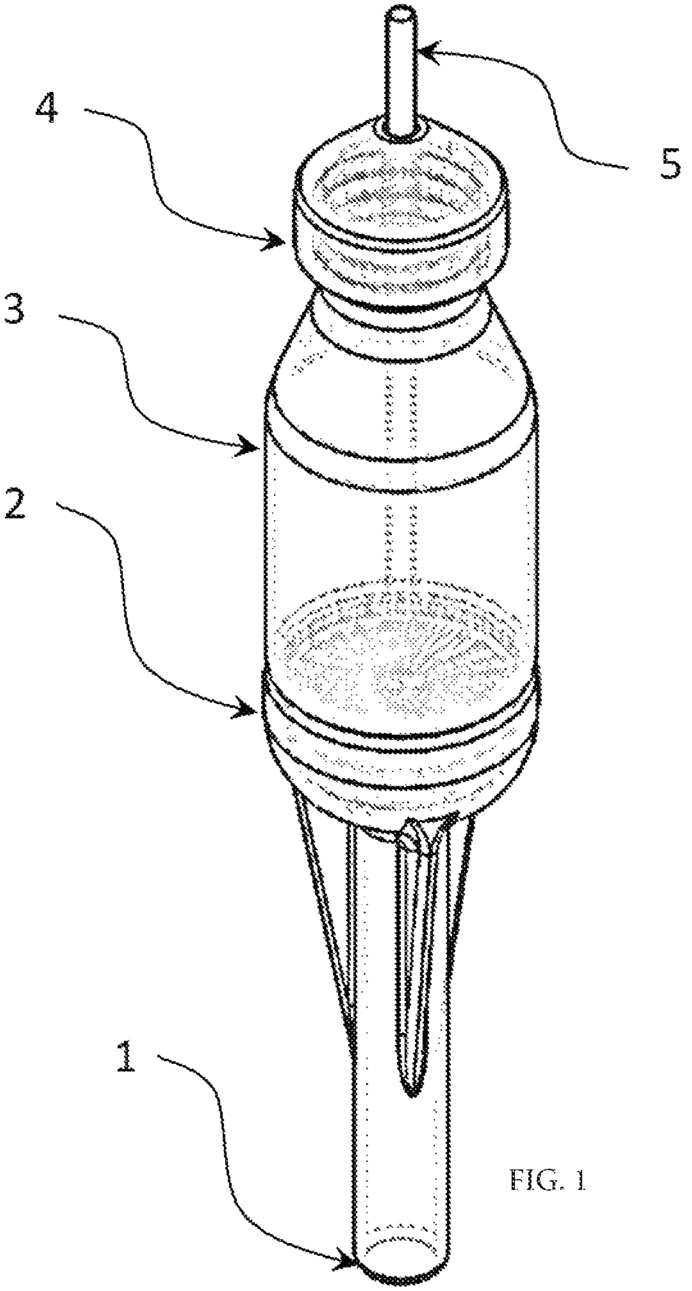
FIG. 1 is a perspective view of an exemplary embodiment of the present invention.
Figure 2:
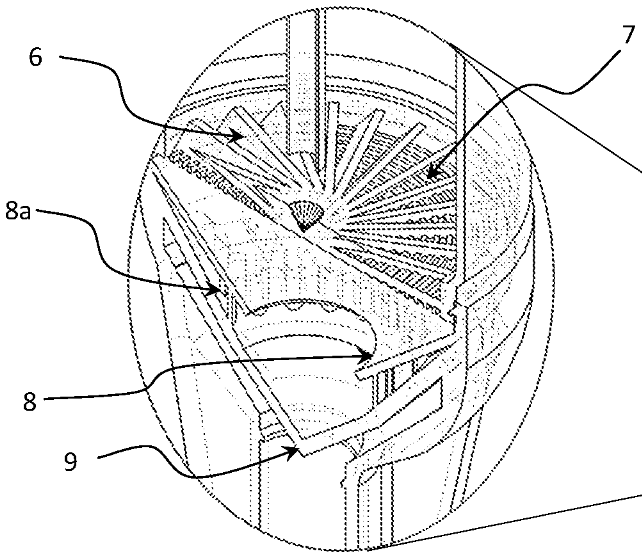
FIG. 2 is a section view of FIG. 1.
Figure 3:
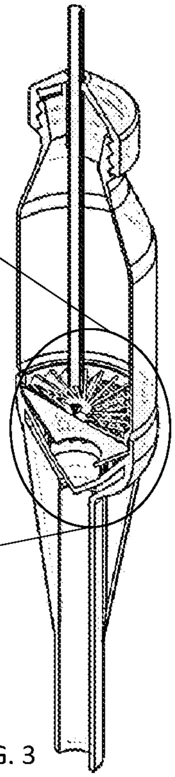
FIG. 3 is a detailed perspective view of FIG. 2.

The following detailed description is of the best currently contemplated modes of carrying out exemplary embodiments of the invention. The description is not to be taken in a limiting sense, but is made merely for the purpose of illustrating the general principles of the present invention.

Referring now to FIGS. 1 through 4, the present invention may include a powder dispensing apparatus with vortex agitation having the following systemic components:

Pneumatic pressure inlet (from pressure source)—1

Vortex generating geometry/torturous flow path portion—2

Powder Container—3

Powder container cap—4

Apparatus outlet tube (powder discharge)—5

Vortex generating vanes—6

Concentric ribs—7

Funnel portion having torturous flow path geometry—8

Interlocking c-shaped supports—**8*a***

Conical portion having powder anti-back flow geometry—9

Cutouts—**9*a***

Referring to FIGS. 1 through 4, the pressure inlet 1 may be located below the powder container 3. The funnel portion having torturous flow path geometry 8 is located downstream of the pressure inlet 1 but before the concentric ribs 7 and the vortex generating vanes 6. The conical portion having powder anti-back flow geometry 9 is also integrated in the funnel portion having torturous flow path geometry 8. The vortex generating vanes 6 and the concentric ribs 7 are located at the bottom of the powder container 3. The top of the powder container 3 may utilize the powder container cap 4, which holds the outlet tube 5.

Figure 4:
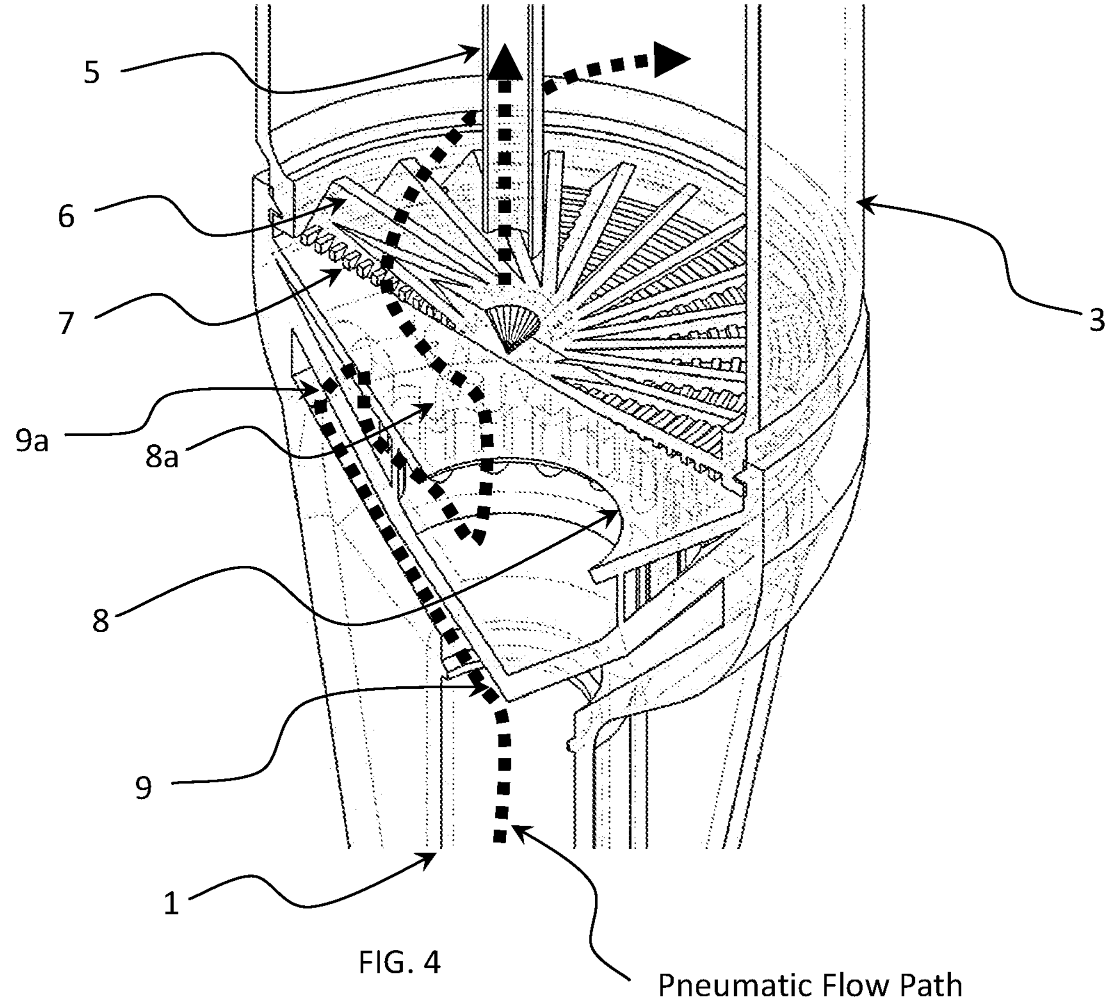
FIG. 4 is an enlarged detailed perspective view of FIG. 3.

The powder container 3 is loaded with powder (not shown) by removing the powder container cap 4 and adding powder. The powder container cap 4 is replaced. To dispense powder, pneumatic pressure (not shown) is applied to the inlet 1 causing air flow into the apparatus. This air travels up the inlet 1 around the powder back flow prevention geometry 9, preferably embodied as a conical shape, up through the torturous flow path geometry 8, which is preferably embodied as a funnel shape having pairs of interlocking c shapes **8*a* as best seen in FIG. 4. The interlocking c shapes 8*a* are located between the funnel shape 8 and conical shape 9. Conical shape 9 also includes cutouts 9*a* (FIG. 4) to provide a flow path form conical shape 9 to funnel shape 8. From funnel shape 8, air continues to flow between the concentric ribs 7 and then through the vortex generating vanes 6 which causes the air to swirl in a vortex fashion as it interacts with the powder contained in the powder container 3. The vortex agitated air and powder mixture then flows out of the powder container 3 via the outlet tube 5** and on to the intended application site for the powder.

The device in its preferred embodiment of the apparatus is produced by 3D printing (also known as additive manufacturing). The lower portion of the device includes the pneumatic pressure inlet 1, the conical portion having powder anti-back flow geometry 9 and the funnel portion having torturous flow path 8 which may be printed as a single piece. The middle section of the device (also referred to in the Figs. as vortex generating geometry/tortuous flow path portion 2) includes the concentric ribs 7, vortex generating vanes 6 and powder container 3 which may be printed as a single piece. The upper section includes the powder container cap 4 and the outlet tube 5, which may be printed of a single piece. The lower and middle sections are affixed to each other either mechanically or chemically (glue, epoxy, or any other suitable adhesive or attachment mechanism). These parts could also be produced via injection molding or casting, but would require the device to be produced in more pieces to support the manufacturing process.

The vortex generating vanes 6, conical portion having powder anti-back flow geometry 9, concentric rib geometry 7, powder container 3, and powder container cap 4, are all required for this device to function most efficiently. It is noted that the device will also function without all of these components. In a preferred embodiment, the vortex generating vanes 6 is disposed at the bottom of the powder container 3 and above the funnel portion having torturous flow geometry 8 and the conical portion having anti-back flow geometry 9. The concentric ribs 7 could be located below the vortex generating vanes 6 or be incorporated into the vortex generating vane geometry 6. The conical portion having anti-back flow geometry 9 and funnel portion having torturous path geometry 8 can be separate or combined features. A filtration device could be added in the pneumatic pressure inlet 1 to potentially make the device work better if required based on the type of powder it is intended to be used for.

It is noted that while funnel portion having tortuous flow path geometry 8 and conical portion having powder anti-back flow geometry 9 are described as funnel-shaped and conical-shaped, respectively, the specific shape of each portion is not so limited and these portions may be shaped in any suitable manner.

Vortex generating vanes 6 may be at an angle of 5 degrees to 85 degrees from horizontal, wherein horizontal is 0 degrees. Preferably, the vortex generating vanes 6 are at an angle of 15 degrees to 70 degrees and more preferably they may be at an angle of 30 degrees to 55 degrees.

EXAMPLES

Example 1

To operate the device, the user would perform the following actions:

A) Remove the powder container cap 4 located at the outlet end of the device.

B) Fill the powder container 3 with the user selected power that is intended to be dispensed during operation.

C) Replace the powder container cap 4 onto the device.

D) Attach a pneumatic pressure source (e.g., a hand pump, electric pump, pressurized canister) to the device pneumatic pressure inlet 1.

E) Aim the outlet tube 5 at the desired area for powder to be applied.

F) Apply pneumatic pressure via the pressure source to the pneumatic pressure inlet 1 of the device causing pneumatic flow through the conical portion having powder anti-back flow geometry 9, the funnel portion having torturous flow path geometry 8, the concentric ribs 7, and then through the vortex generating vanes 6 where a vortex action is imparted to the pneumatic flow as it interacts with the powder contained in the powder container 3. This vortex action efficiently agitates the powder causing the powder to mix strongly with the pneumatic flow. This mixture then flows through the outlet tube 5 and is dispensed onto the desired area.

G) Pneumatic pressure is applied until the desired amount of powder has dispensed into the target area and then pneumatic pressure is removed.

H) Remove pneumatic pressure from the device pneumatic pressure inlet 1.

It will be appreciated by those skilled in the art that while the powder dispensing device has been described in detail herein, the invention is not necessarily so limited and other examples, embodiments, uses, modifications, and departures from the embodiments, examples, uses, and modifications may be made without departing from the process and all such embodiments are intended to be within the scope and spirit of the appended claims.

What is claimed is:

1. A powder dispensing device comprising:
- an inlet having an inner diameter and outer diameter and a top and a bottom;
- a flow portion having a convex curved bottom and a cylindrical top and wherein the convex curved bottom is in communication with the top of the inlet;
- a powder container having a conical top and a cylindrical bottom and wherein the cylindrical bottom is in communication with the cylindrical top of the flow portion;
- at least two concentric ribs located in the cylindrical bottom of the powder container;
- at least two vortex generating vanes located above the at least two concentric ribs;
- a powder container cap having a conical top and a cylindrical bottom and wherein the conical top has a cutout for receiving an outlet tube and wherein the cylindrical bottom is in communication with the cylindrical top of the powder container; and
- the outlet tube is in communication with the powder container and is inserted through the cutout of the conical top of the powder container cap.

2. The powder dispensing device of claim 1 wherein the bottom of the inlet is capable of being in communication with a pneumatic pressure.

3. A powder dispensing device comprising:
- an inlet having an inner diameter and outer diameter and a top and a bottom;
- a flow portion having a convex curved bottom and a cylindrical top and wherein the convex curved bottom is in communication with the top of the inlet;
- a conical portion having a top and a bottom wherein the top of the conical portion is located inside the cylindrical top of the flow portion and the bottom of the conical portion extends downwards into the convex curved bottom of the flow portion such that a flow path is created between the conical portion and the convex curved bottom of the flow portion thereby allowing for fluid flow from the inlet and wherein the conical portion has at least two cutouts located along a top circumference of the conical portion;
- a funnel portion having a top and a bottom located inside the top of the conical portion and wherein there are at least two pairs of interlocking c-shaped supports between the funnel portion and the conical portion such that a tortuous flow path is created between the funnel portion and the conical portion;
- a powder container having a conical top and a cylindrical bottom and wherein the cylindrical bottom is in communication with the cylindrical top of the flow portion;
- a powder container cap having a conical top and a cylindrical bottom and wherein the conical top has a cutout for receiving an outlet tube and wherein the cylindrical bottom is in communication with the cylindrical top of the powder container; and
- the outlet tube is in communication with the powder container and is inserted through the cutout of the conical top of the powder container cap.

4. The powder dispensing device of claim 3 wherein the bottom of the inlet is capable of being in communication with a pneumatic pressure.

5. A powder dispensing device comprising:
- an inlet having an inner diameter and outer diameter and a top and a bottom;
- a flow portion having a top and a bottom wherein the bottom is in communication with the top of the inlet;
- a conical portion having a top and a bottom located inside the flow portion such that a flow path is created between the conical portion and the flow portion thereby allowing for fluid flow from the inlet and wherein the conical portion has at least two cutouts located along a top circumference of the conical portion;
- a funnel portion having a top and a bottom located inside the top of the conical portion and wherein there are at least two pairs of interlocking c-shaped supports between the funnel portion and the conical portion such that a tortuous flow path is created between the funnel portion and the conical portion;
- a powder container having a top and a bottom and wherein the cylindrical bottom is in communication with the funnel portion;
- at least two concentric ribs located in the cylindrical bottom of the powder container;

at least two vortex generating vanes located in the cylindrical bottom of the powder container;

a powder container cap having a top and a bottom and wherein the top has a cutout for receiving an outlet tube and wherein the bottom is in communication with the top of the powder container; and the outlet tube is in communication with the powder container and is inserted through the cutout of the top of the powder container cap.

6. The powder dispensing device of claim 5 wherein the flow portion has a convex curved bottom and a cylindrical top.

7. The powder dispensing device of claim 6 wherein the powder container cap has a conical top and a cylindrical bottom.

8. The powder dispensing device of claim 6 wherein the at least two vortex generating vanes are located above the at least two concentric ribs.

9. The powder dispensing device of claim 6 wherein the at least two vortex generating vanes are located below the at least two concentric ribs.

10. The powder dispensing device of claim 6 wherein the powder container has a conical top and a cylindrical bottom.

11. The powder dispensing device of claim 10 wherein the at least two vortex generating vanes are located above the at least two concentric ribs.

12. The powder dispensing device of claim 10 wherein the at least two vortex generating vanes are located below the at least two concentric ribs.

13. The powder dispensing device of claim 10 wherein the powder container cap has a conical top and a cylindrical bottom.

14. The powder dispensing device of claim 13 wherein the at least two vortex generating vanes are located above the at least two concentric ribs.

15. The powder dispensing device of claim 13 wherein the at least two vortex generating vanes are located below the at least two concentric ribs.

16. The powder dispensing device of claim 5 wherein the powder container has a conical top and a cylindrical bottom.

17. The powder dispensing device of claim 16 wherein the powder container cap has a conical top and a cylindrical bottom.

18. The powder dispensing device of claim 5 wherein the powder container cap has a conical top and a cylindrical bottom.

19. The powder dispensing device of claim 5 wherein the at least two vortex generating vanes are located above the at least two concentric ribs.

20. The powder dispensing device of claim 5 wherein the at least two vortex generating vanes are located below the at least two concentric ribs.

* * * * *